United States Patent
Chouard et al.

(10) Patent No.: US 9,708,982 B2
(45) Date of Patent: Jul. 18, 2017

(54) METHOD FOR MOUNTING AN AIRCRAFT ENGINE ON A PYLON, AND ENGINE FASTENER FOR IMPLEMENTING SAID METHOD

(75) Inventors: Pierre-Alain Jean-Marie Philippe Hugues Chouard, Melun (FR); Maryline Besnard, Vigneux sur Seine (FR)

(73) Assignee: SNECMA, Paris (FR)

( * ) Notice: Subject to any disclaimer, the term of this patent is extended or adjusted under 35 U.S.C. 154(b) by 566 days.

(21) Appl. No.: 14/110,864

(22) PCT Filed: Mar. 30, 2012

(86) PCT No.: PCT/FR2012/050686
§ 371 (c)(1),
(2), (4) Date: Oct. 9, 2013

(87) PCT Pub. No.: WO2012/172208
PCT Pub. Date: Dec. 20, 2012

(65) Prior Publication Data
US 2014/0033729 A1 Feb. 6, 2014

(30) Foreign Application Priority Data

Apr. 14, 2011 (FR) ..................................... 11 53251

(51) Int. Cl.
*F02C 7/20* (2006.01)
*B64D 27/26* (2006.01)

(52) U.S. Cl.
CPC ................ *F02C 7/20* (2013.01); *B64D 27/26* (2013.01); *B64D 2027/266* (2013.01)

(58) Field of Classification Search
CPC ....... F02C 7/20; F05D 2240/90; B64D 27/02; B64D 27/26; B64D 29/02; B64D 2027/266
See application file for complete search history.

(56) References Cited

U.S. PATENT DOCUMENTS

| 6,059,227 A * | 5/2000 | Le Blaye ............... B64D 27/26 244/54 |
| 6,988,692 B2 * | 1/2006 | Pasquer ................. B64D 27/26 244/54 |

(Continued)

FOREIGN PATENT DOCUMENTS

| FR | 2 891 243 | 3/2007 |
| FR | 2 891 244 | 3/2007 |

(Continued)

OTHER PUBLICATIONS

International Search Report as issued for International Application No. PCT/FR2012/050686, dated Jul. 24, 2012.

*Primary Examiner* — Arun Goyal
(74) *Attorney, Agent, or Firm* — Pillsbury Winthrop Shaw Pittman LLP

(57) ABSTRACT

A method for mounting an aircraft engine on a pylon includes positioning at least a first shear pin either in a first opening provided in a front engine fastener which is previously attached to the engine using connecting rods, or in a first bore provided in a front surface of the pylon; prepositioning the assembly including the engine and the front engine fastener relative to the pylon by placing the first shear pin opposite a receiving cavity, the receiving cavity being either the first bore, if the first shear pin has been positioned in the first opening, or the first opening, if the first shear pin has been positioned in the first bore; and inserting the first shear pin into the receiving cavity.

10 Claims, 6 Drawing Sheets

(56) References Cited

U.S. PATENT DOCUMENTS 7,909,285 B2 * 3/2011 Dron .................. B64D 27/26
244/54
7,963,480 B2 * 6/2011 Lafont ................ B64D 27/26
244/54

FOREIGN PATENT DOCUMENTS

FR 2 916 424 11/2008
FR 2 948 634 2/2011

* cited by examiner

METHOD FOR MOUNTING AN AIRCRAFT ENGINE ON A PYLON, AND ENGINE FASTENER FOR IMPLEMENTING SAID METHOD

CROSS-REFERENCE TO RELATED APPLICATIONS

This is the U.S. National Stage of PCT/FR2012/050686, filed Mar. 30, 2012, which in turn claims priority to French Patent Application No. 1153251, filed Apr. 14, 2011, the entire contents of all applications are incorporated herein by reference in their entireties.

TECHNICAL FIELD OF THE INVENTION

The present invention relates to a method for mounting an aircraft engine onto a pylon.

The technical field of the invention is generally that of aircraft engines, and more particularly that of attaching engines under aircraft wings.

TECHNOLOGICAL BACKGROUND OF THE INVENTION

FIG. 1 is a schematic representation of an aircraft engine 10 attached to a pylon 13, according to a first attaching means generally applied in prior art. In the description that follows, by X, it is meant the longitudinal direction of the pylon 13, which can also be considered as the longitudinal direction of the engine 10, the direction X being parallel to a longitudinal axis 18 of the engine 10. On the other hand, by Y, it is meant the direction directed transversally to the pylon 13 and that can also be considered as the transverse direction of the engine 10, and Z the vertical direction, these three directions X, Y and Z being orthogonal between each other. Moreover, the terms "front" and "back" are to be considered with respect to a direction of advance of the aircraft experienced as a result of a thrust exerted by the engine 10, this direction being schematically represented by an arrow 19. The engine 10 has available a fan casing 11 having a great dimension, and includes in the rear a turbine casing 12 having a smaller dimension. The fan casing 11 and the turbine casing 12 are of course integral with each other. The fan casing 11 is cylindrically shaped, said cylinder extending along the axis X. The pylon 13, also called strut, enables the engine 10 to be suspended beneath the wings 14 of the aircraft. The pylon 13 actually forms the interface between the engine 10 and the wings 14. The pylon 13 also enables strains generated by the engine 10 to be transmitted to the structure of the aircraft, and allows fuel, electrical, hydraulic and pneumatic systems to be conveyed between the engine 10 and the aircraft. The engine 10 is provided with a system for attaching the engine 10 to the pylon 13, which is interposed between the engine 10 and a lower face 15 of the pylon 13. The attaching system includes a front engine fastener 16 and a back engine fastener 17. The front engine fastener 16 connects the fan casing 11 to the lower face 15 of the pylon 13, and the back engine fastener 17 connects the turbine casing 12 to the lower face 15 of the pylon 13.

FIG. 2 is a perspective view of the front engine fastener 16. The front engine fastener 16 includes a suspension beam 21 lying on a coat hanger 22, and connected thereto through hinged connecting rods 23. The suspension beam 21 includes a planar upper face 24, intended to be in contact and attached via bolts to the lower face 15 of the pylon 13. The coat hanger 22 is curved in shape to accurately conform to the cylindrical shape of the fan casing 11, and is attached to the same via bolts.

FIGS. 3a, 3b and 3c represent the different steps of mounting the engine 10 to the pylon 13, said pylon 13 being secured to the wings 14. The elements of said figures are represented along a plane YZ. In FIG. 3a, the engine 10 lies on the ground. The front engine fastener 16 is attached to the fan casing 11 of the engine 10. Hoisting harnesses 30 are secured on the one end to the wings 14, and on the other hand to the fan casing 11. The vertical hoisting of an aircraft engine using hoisting harnesses is a method well known by those skilled in the art. In FIG. 3b, the engine 10 is being vertically hoisted through the hoisting harnesses 30. In FIG. 3c, the upper face 24 of the front engine fastener 16 is pressed against the lower face 15 of the pylon 13, and attached to the same via bolts 31.

Such an attachment of the engine 10 to the pylon 13 results in a space between the engine 10 and the pylon 13. The height of said space is the height of the front engine fastener 16, since the height of the fan casing 11 is higher than the height of the turbine casing 12. But, for aerodynamic reasons, it is attempted to bring the engine 10 as close as possible to the pylon 13. This indeed enables the aerodynamic drag of the pylon 13 to be decreased and engines to have a higher FAN diameter.

To overcome this drawback, a solution wherein a front engine fastener and a method for mounting an engine onto a pylon, such that said front engine fastener is attached to the front face of the pylon, and no longer to a lower face of the pylon, was suggested. Thus, the space between the engine and the pylon can be decreased. The mounting method disclosed consists in vertically hoisting the engine using hoisting harnesses, up to have four though openings provided in the front engine fastener coincide, with four bores provided in the front face of the pylon, and then inserting a shear pin into each of the apertures thus formed. The front engine fastener is thus attached to the front face of the pylon using fours shear pins and bolts.

However, the mounting method thus described is complicated because inserting a shear pin through an opening of the front engine fastener, and then through a bore of the pylon, requires great positioning accuracy of the front engine fastener towards the pylon, in particular since the operation should be repeated four times, for each of the four shear pins to be inserted. For this, the time for mounting the engine to the pylon is long.

General Description of the Invention

The object of the invention offers a solution to the problem just set out, by providing a method for mounting an aircraft to a pylon through a front engine fastener, said front engine fastener being attached to a front face of said pylon via two shear pins, said two shear pins being previously inserted in through openings of the front engine fastener or in bores provided on the front face of the pylon. Decreasing the number of shear pins relative to the existing solution, and pre-inserting them, make the attachment of the front engine fastener to the front face of the pylon less labour-intensive.

According to a first aspect, the invention thus relates essentially to a method for mounting an aircraft engine onto a pylon, characterised in that it includes the following steps:
 positioning at least a first shear pin either:
  into a first opening provided in a front engine fastener, previously attached to the engine using connecting rods, or into a first bore provided in a front face of the pylon;
pre-positioning the assembly including the engine and the front engine fastener, relative to the pylon by placing the first shear pin opposite a receiving cavity, said receiving cavity being:
  either the first bore, if the first shear pin has been positioned into the first opening;
  or the first opening, if the first shear pin has been positioned into the first bore;
inserting the first shear pin into the receiving cavity.

Besides the main characteristics just mentioned in the preceding paragraph, the method according to the invention can have one or more further characteristics from the following ones, considered alone or according to any technical possible combinations:

the step of pre-positioning the engine relative to the pylon includes the following substeps:
  vertically hoisting the assembly including the engine and the front engine fastener;
  positioning an upper part of the front engine fastener and the front face of the pylon substantially in parallel;
the step of pre-positioning the engine relative to the pylon includes a further substep between the hoisting substep and the positioning substep, of shifting forwardly relative to the axis X the assembly including the front engine fastener and the engine;
the step of pre-positioning the engine relative to the pylon includes a further substep before the hoisting substep, of positioning at least one wedge at least at one of the connecting rods, to keep the front engine fastener into position relative to the engine, at an angle suitable for the vertical hoisting performed during the hoisting substep, continuously from the ground, until the first shear pin is located substantially at the same height as the receiving cavity;
the step of pre-positioning the engine relative to the pylon includes a further substep of removing the at least one wedge after the substep of substantially parallel positioning;
the substep of substantially parallel positioning is performed by swinging the front engine fastener relative to the engine;
the step of attaching the front engine fastener includes a step of screwing at least one screw through at least one hole provided to the front engine fastener, in a bore provided in the front face of the pylon;
the method implements two shear pins;
each shear pin is divided into two.

The invention and its different applications will be better understood upon reading the following description and upon examining the accompanying figures.

BRIEF DESCRIPTION OF THE FIGURES

The figures are only presented by way of indicating and in no way limiting purpose of the invention. The figures show.

DETAILED DESCRIPTION OF AT LEAST ONE EMBODIMENT OF THE INVENTION

Unless otherwise indicated, a same element appearing in different figures has a single reference number.

Figure 1:
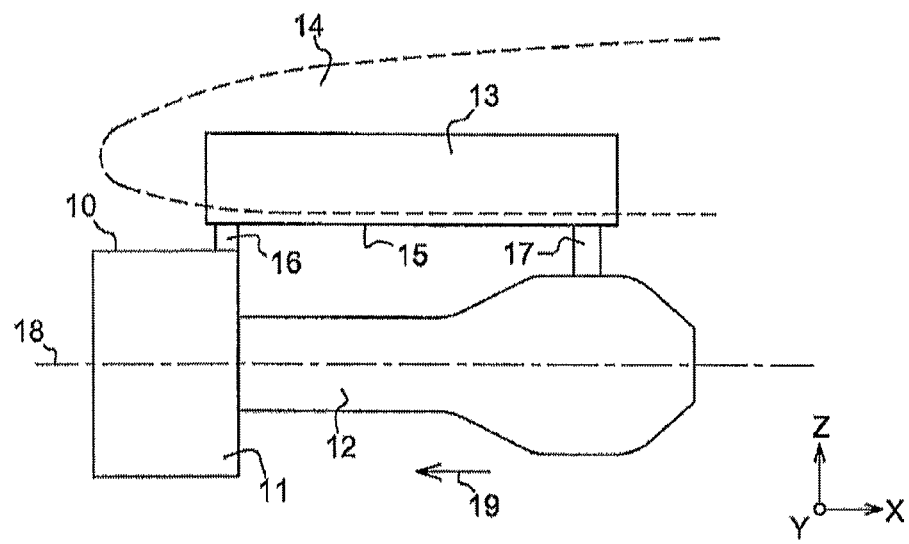
in FIG. 1, already described, a schematic representation of an aircraft engine 10 attached to a pylon 13 in particular via a front engine fastener 16, according to a first attaching means known in prior art.
Figure 2:
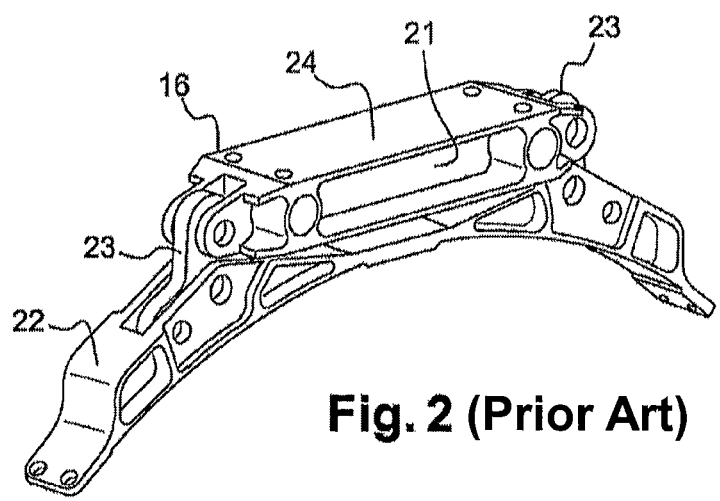
in FIG. 2, already described, a perspective view of the front engine fastener 16.
Figure 3A:
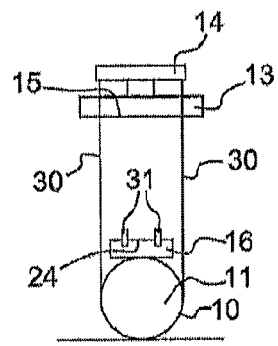
in FIGS. 3a, 3b and 3c, already described, the steps of mounting the engine 10 to the pylon 13.
Figure 3B:
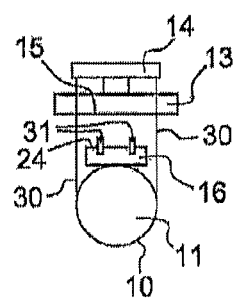
Figure 3C:
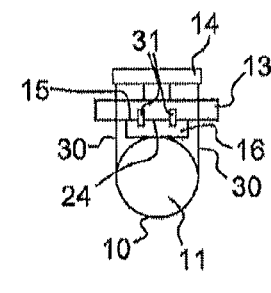
Figure 4:
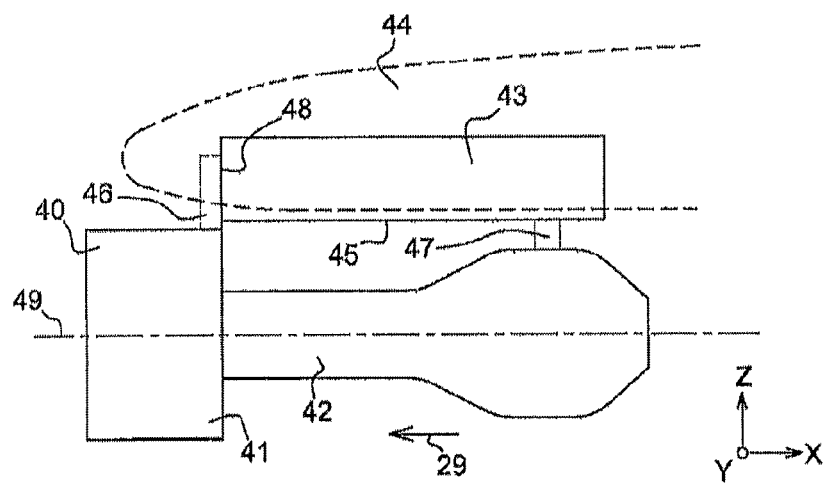
in FIG. 4, a schematic representation of an aircraft engine 40 attached to a pylon 43, according to the invention.

FIG. 4 is a schematic representation of an aircraft engine 40 attached to a pylon 43, according to the invention.

Throughout the description that follows, by X, it is meant the longitudinal direction of the pylon 43, which can also be considered as the longitudinal direction of the engine 40, the direction X being parallel to a longitudinal axis 49 of the engine 40. On the other hand, by Y, it is meant the direction directed transversally relative to the pylon 43 and which can also be considered as the transverse direction of the engine 40, and Z the vertical direction, these three directions X, Y and Z being orthogonal between each other. Moreover, the terms "front" and "back" are to be considered relative to a direction of advance of the aircraft experienced as a result of a thrust exerted by the engine 40, this direction being schematically represented by an arrow 29.

The pylon 43 is attached to wings 14 of the aircraft. The engine 40 includes a fan casing 41 and a turbine casing 42. The fan casing 41 and the turbine casing 42 are integral with each other. The engine 40 is provided with a system for attaching the engine 40 to the pylon 43, including a front engine fastener 46 and a back engine fastener 47. The front engine fastener 46 connects the fan casing 41 to a front face 48 of the pylon 43, and the back engine fastener 47 connects the turbine casing 42 to a lower face 45 of the pylon 43.

Figure 5:
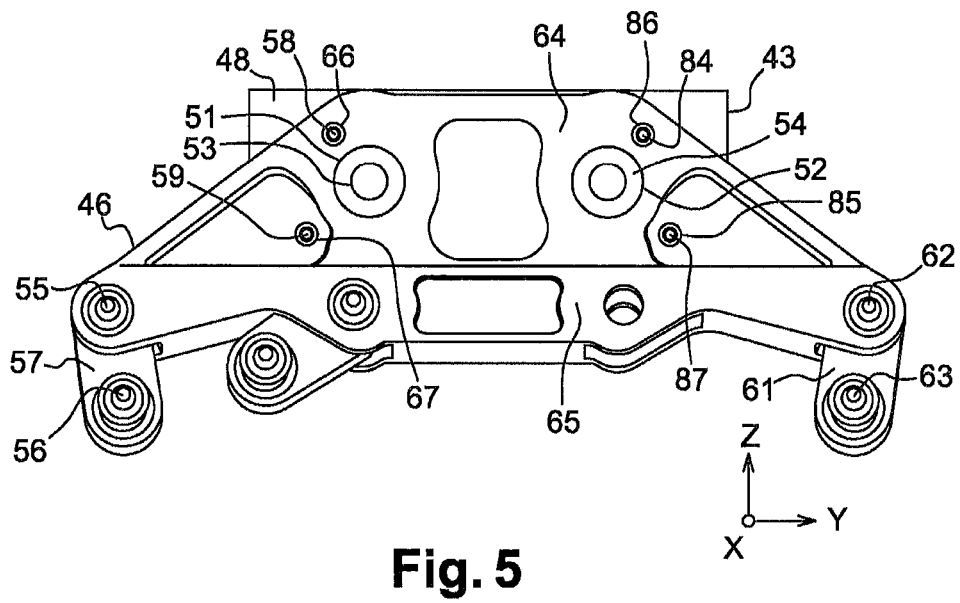
in FIGS. 5 and 6, representations of a front engine fastener 46 used in the mounting method according to the invention.
Figure 6:
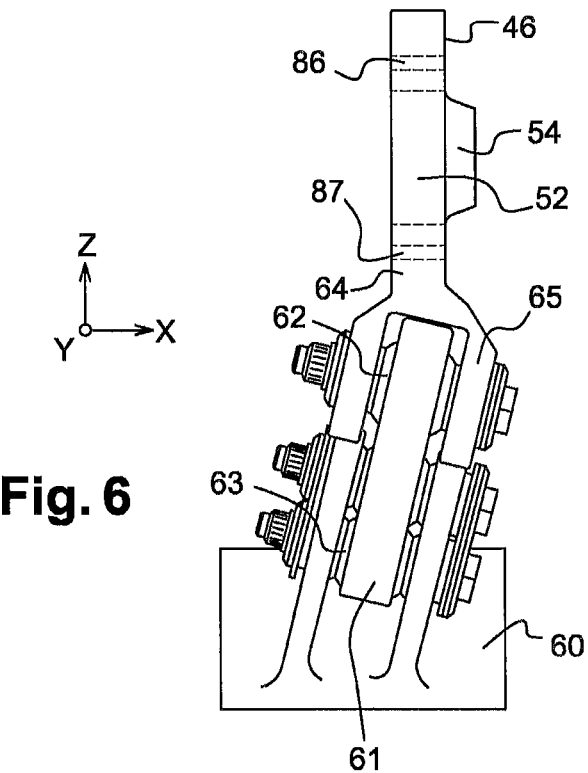

FIG. 5 and FIG. 6 represent the front engine fastener 46 used in the mounting method according to the invention. FIG. 5 shows the front engine fastener along a plane YZ containing the axes Y and Z, attached to the front face 48 of the pylon 43. FIG. 6 represents the front engine fastener 46 along a plane XZ containing the axes X and Z, connected to a coat hanger 60, via a system of ball and socket joints and connecting rods explained later. The coat hanger 60 is integrally attached to the fan casing 41 of the engine 40.

The front engine fastener 46 includes an upper part 64 and a lower part 65. The upper part 64 and the lower part 65 extend along planes being titled with respect to each other. The upper part 64 is intended to be pressed against the front face 48 of the pylon 43, and attached via a first shear pin 53 and a second shear pin 54. A first screw 84, a second screw 85, a third screw 58 and a fourth screw 59 are also used for the attachment. The first shear pin 53 and the second shear pin 54 are represented inserted in a first opening 51 and a second opening 52 respectively passing through the front engine fastener 46 along the direction X. The first screw 84, the second screw 85, the third screw 58 and the fourth screw 59 are represented inserted in a first hole 86, a second hole 87, a third hole 66 and a fourth hole 67 respectively passing through the front engine fastener 46 along the direction X.

The lower part 65 of the front engine fastener 46 includes four connecting rods and four pairs of ball and socket joints. Each pair of ball and socket joints is associated with a connecting rod. Only three pairs of ball and socket joints and the three associated connecting rods are represented in FIG. 5. Each pair of ball and socket joints includes an upper ball and socket joint and a lower ball and socket joint. The upper ball and socket joint is used to connect the front engine fastener 46 to the associated connecting rod, and the lower ball and socket joint is used to connect the associated connecting rod to the coat hanger 60.

A first connecting rod 57 is connected to the front engine fastener 46 via a first upper ball and socket joint 55, and connected to the coat hanger 60 via a first lower ball and socket joint 56. A second ball and socket joint 61 is connected to the front engine fastener 46 via a second upper ball and socket joint 62, and connected to the coat hanger 60 via a second lower ball and socket joint 63. The same is true for the other two connecting rods and the other two pairs of ball and socket joints. This system of connecting rods and ball and socket joints enables the upper part 64 of the front engine fastener 46 to be hinged to the coat hanger 60. The advantage of this hinge is explained later.

Figure 7:
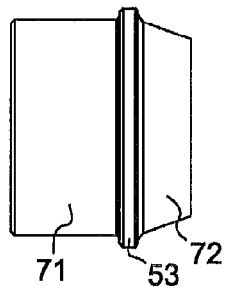
in FIGS. 7 to 9, a perspective view of a shear pin used in the mounting method according to the invention.

FIG. 7 represents the first shear pin 53. The first shear pin 53 includes a cylindrical part 71 for being inserted and adjusted prior to mounting, in the first opening 51 of the front engine fastener 46. The first shear pin 53 also includes a half-conical part 72 for being inserted in a first bore provided in the front face 48 of the pylon 43. The first bore is half-conical in shape, complementary to the shape of the half-conical part 72 of the first shear pin 53. Said half-conical part 72 is constructed in such a shape in order to make easier guiding the first shear pin 53 when being inserted into the first bore.

Figure 8:
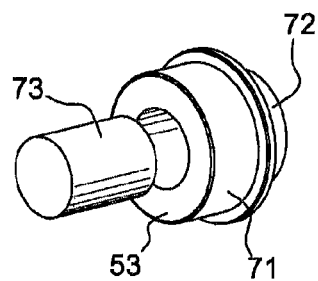
Figure 9:
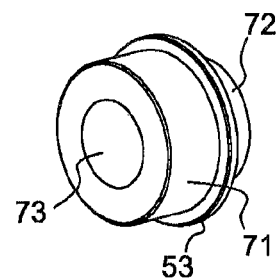

Advantageously, as shown in FIGS. 8 and 9, the first shear pin 53 is divided into two, that is it includes an inner shear pin 73 cylindrical in shape, nested in the cylindrical part 71. The inner shear pin 73 is adjusted and tightened in the cylindrical part 71, so as to prevent any movement of the inner shear pin 73 relative to the cylindrical part 71. The advantage of the first shear pin 53 being divided into two is to provide the "fail safe" function. In the case of a crack in the cylindrical part 71, this function consists in stopping the crack propagation and ensuring passing of strain paths, through the inner shear pin 73.

The second shear pin 54 has the same shape as the first shear pin 53: it comprises a cylindrical part for being inserted and adjusted previously to the mounting, into the second opening 52 of the front engine fastener 46. The second shear pin 54 also comprises a half-conical part for being inserted in a second bore 82, represented in FIG. 10b. The second bore 82 is provided in the front face 48 of the pylon 43 and is half-conical in shape, complementary to the shape of the half-conical part of the second shear pin 54. Advantageously, the second shear pin 54 is divided into two.

Since the first shear pin 53 and the second shear pin 54 are inserted and adjusted previously to the mounting in the first opening 51 and the second opening 52 of the front engine fastener 46 respectively, they project from the front engine fastener 46. Thus, mounting the engine 40 on the pylon 43 by simple vertical hoisting from the ground, as made in the known solution, is not possible. The invention thus provides a particular mounting method, which is described below.

Figure 10A:
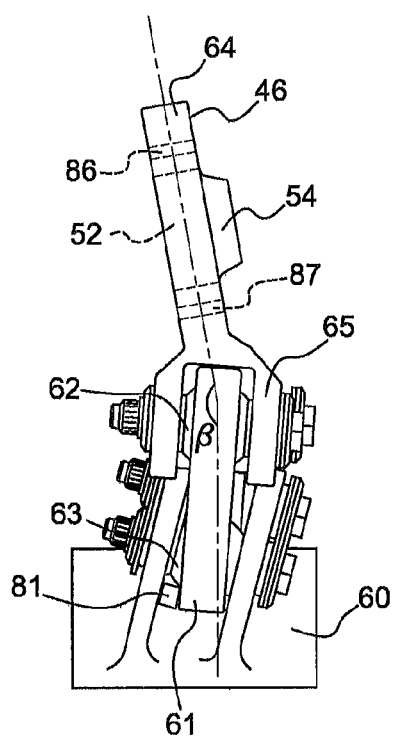
in FIGS. 10a to 10e, steps of the method for mounting the engine 40 to the pylon 43, according to an embodiment of the invention.

FIGS. 10a to 10e illustrate the mounting steps of the method for mounting the engine 40 on the pylon 43 according to a first embodiment of the invention. These steps are the following ones:

represented in FIG. 10a: positioning four wedges at the four lower ball and socket joints, to keep a tilting angle β between the upper part 64 of the front engine fastener 46 and the coat hanger 60, said angle β being determined such that the projections from the first shear pin 53 and the second shear pin 54 are not obstructing upon vertical hoisting the engine 40 by hoisting harnesses. A wedge 81 is represented in FIG. 10a, positioned at the second connecting rod 61 and the second lower ball and socket joint 63.

Figure 10B:
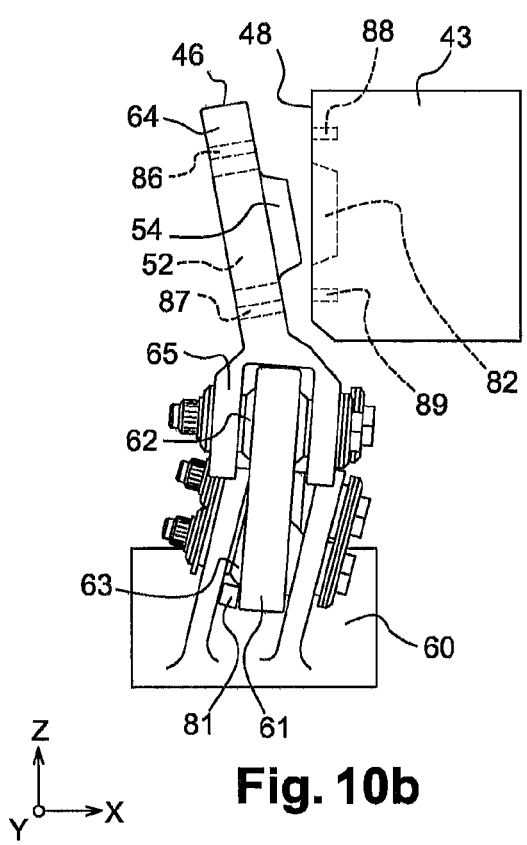

Represented in FIG. 10b: continuous vertical hoisting along the direction Z, of the assembly including the engine 40 and the front engine fastener 46, until the first shear pin 53 is substantially located at the same height as the first bore, and until the second shear pin 54 is located substantially at the same height as the second bore 82. The first hole 86, the second hole 87, the third hole 66 and the fourth hole 67 are then located substantially at the same height as a first bore 88, a second bore 89, a third bore and a fourth bore respectively provided in the front face 48 of the pylon 43.

Figure 10C:
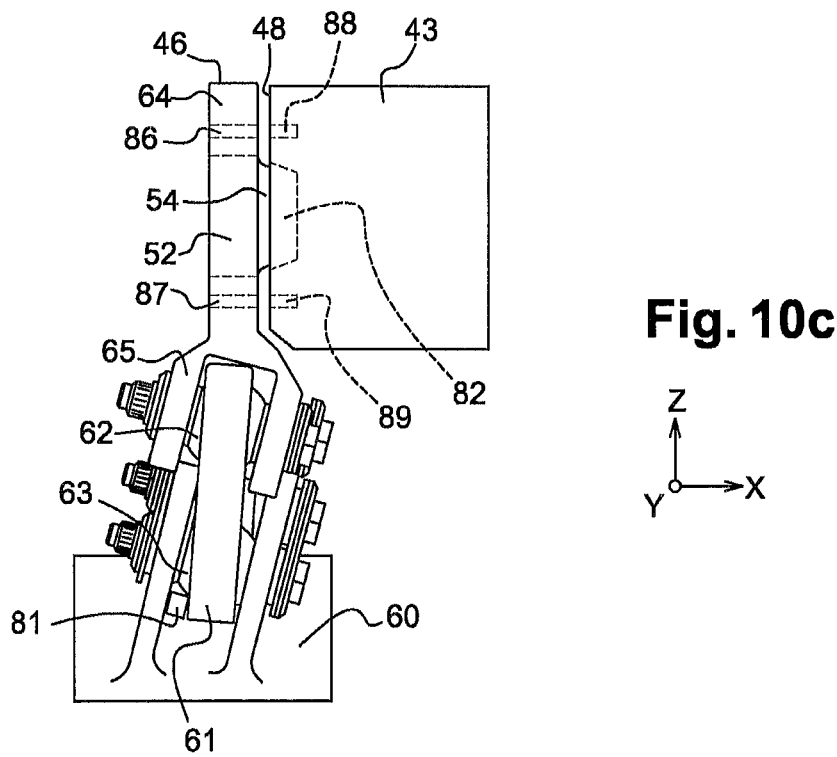

Represented in FIG. 10c: swinging the front engine fastener 46 with respect to the coat hanger 60, for substantially parallel positioning of the upper part 64 of the front engine fastener 46 and the front face 48 of the pylon 43.

Figure 10D:
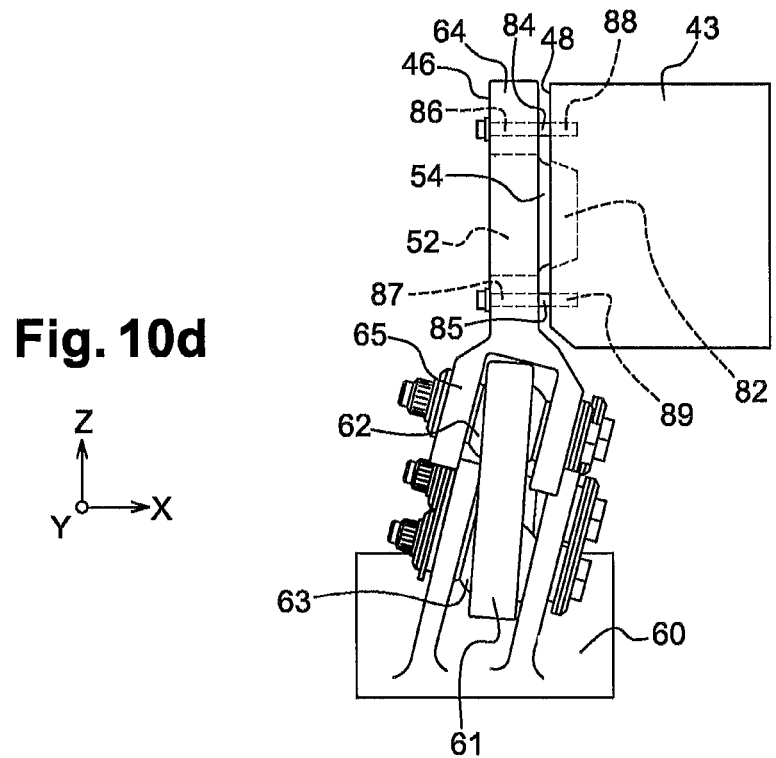

Represented in FIG. 10d: inserting the first screw 84, the second screw 85, the third screw 58 and the fourth screw 59 in the first hole 86, the second hole 87, the third hole 66 and the fourth hole 67 respectively; removing the wedges.

Figure 10E:
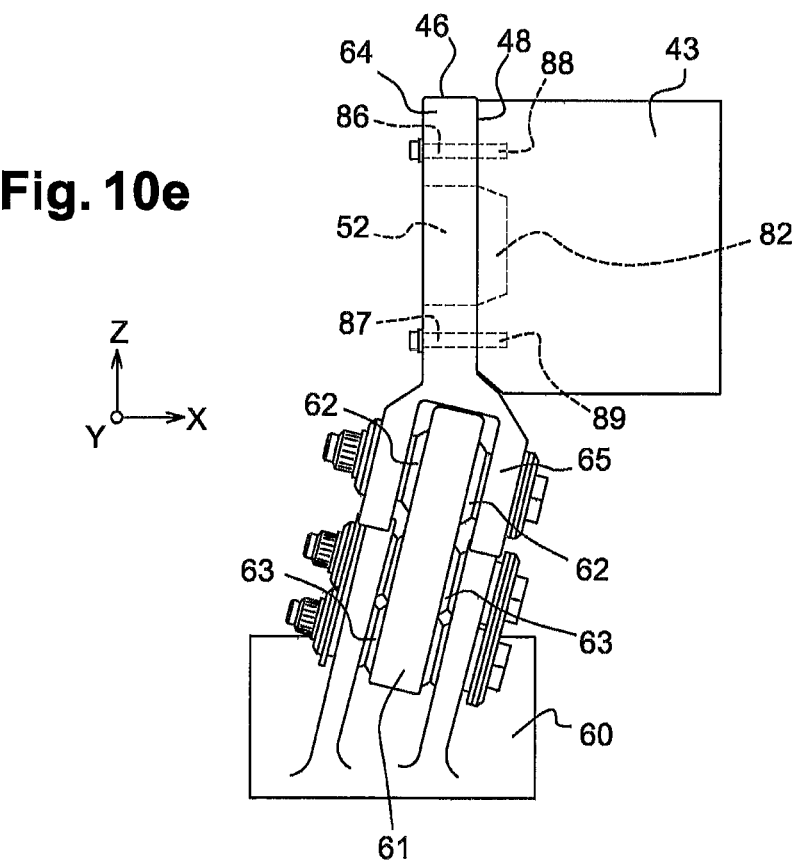

Represented in FIG. 10e:
  bringing the upper part 64 of the front engine fastener 46 closer against the front face 48 of the pylon 43;
  inserting and adjusting the first shear pin 53 and the second shear pin 54 in the first bore and the second bore 82 respectively;
  screwing the first screw 84, the second screw 85, the third screw 58 and the fourth screw 59 in the first bore 88, the second bore 89, a third bore and a fourth bore respectively. The screws are bolted in captive nuts previously set in the bores, which enables the shear pins to be adjusted.

According to a second embodiment of the invention, the first shear pin 53 and the second shear pin 54 are inserted and adjusted previously to the mounting, in the first bore and the second bore 82 respectively of the pylon 43, and not in the first opening 51 and the second opening 52 respectively of the front engine fastener 46. In this case, it is the cylindrical parts of the shear pins which are previously inserted into the bores.

The mounting steps of the method for mounting the engine 40 on the pylon 43 are then the following ones:
  positioning four wedges at the four lower ball and socket joints, to keep a tilting angle β between the upper part 64 of the front engine fastener 46 and the coat hanger 60, said angle β being determined such that the projections from the first shear pin 53 and the second shear pin 54 are not obstructing upon vertically hoisting the engine 40 by hoisting harnesses;
  continuous vertical hoisting along the direction Z, of the assembly including the engine 40 and the front engine fastener 46, until the first opening 51 is substantially located at the same height as the first shear pin 53, and until the second opening 52 is substantially located at the same height as the second shear pin 54. The first hole 86, the second hole 87, the third hole 66 and the fourth hole 67 are substantially located at the same height as the first bore 88, the second bore 89, the third bore and the fourth bore respectively;

swinging the front engine fastener 46 with respect to the coat hanger 60, for substantially parallel positioning of the upper part 64 of the front engine fastener 46 and the front face 48 of the pylon 43;

inserting the first screw 84, the second screw 85, the third screw 58 and the fourth screw 59 in the first hole 86, the second hole 87, the third hole 66 and the fourth hole 67 respectively; removing the wedges.

bringing the upper part 64 of the front engine fastener 46 closer against the front face 48 of the pylon 43;

inserting and adjusting the first shear pin 53 and the second shear pin 54 in the first opening 51 and the second opening 52 respectively;

screwing the first screw 84, the second screw 85, the third screw 58 and the fourth screw 59 in the first bore 88, the second bore 89, the third bore and the fourth bore respectively.

Figure 11:
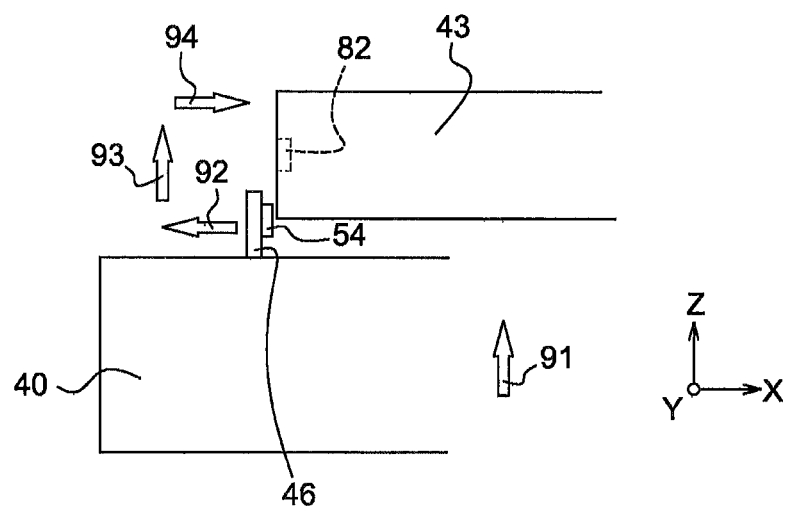
in FIG. 11, steps of the method for mounting the engine 40 to the pylon 43, according to another embodiment of the invention.

FIG. 11 illustrates the different steps of a third embodiment of the method for mounting the engine 40 on the pylon 43 according to the invention. The third embodiment does not use the system of ball and socket joints and connecting rods enabling the upper part 64 to be hinged to the lower part 65 of the front engine fastener 46. However, it requires a tooling on the ground enabling the engine 40 to be shifted along the direction X.

In the third embodiment, the first shear pin 53 and the second shear pin 54 are previously inserted and adjusted in the first opening 51 and the second opening 52 respectively of the front engine fastener 46. The steps are the following ones:

Step 91: the engine 40 is vertically hoisted, along the direction Z, using hoisting harnesses;

Step 92: the engine 40 is shifted along the direction X and forwardly. This shifting is required because of the projections from the first shear pin 53 and the second shear pin 54;

Step 93: the engine 40 is vertically hoisted again, along the direction Z until the first shear pin 53 faces the first bore, and the second shear pin 54 faces the second bore 82;

Step 94:
the upper part 64 of the front engine fastener 46 is brought closer against the front face 48 of the pylon 43;
the first shear pin 53 is inserted and adjusted in the first bore, and the second shear pin 54 is inserted and adjusted in the second bore 82;
the screws are inserted and screwed in the bores, which enables the shear pins to be adjusted.

According to a fourth embodiment of the mounting method according to the invention, the first shear pin 53 and the second shear pin 54 are previously inserted and adjusted in the first bore and the second bore 82 respectively. In this case, the steps of the method are the following ones:

the engine 40 is vertically hoisted, along the direction Z, using hoisting harnesses;

the engine 40 is shifted along the direction X and forwardly;

the engine 40 is vertically hoisted again, along the direction Z until the first shear pin 53 faces the first opening 51, and the second shear pin 54 faces the second opening 52;

the upper part 64 of the front engine fastener 46 is brought closer against the front face 48 of the pylon 43;

the first shear pin 53 is inserted and adjusted in the first opening 51, and the second shear pin 54 is inserted and adjusted in the second opening 52;

the screws are inserted and screwed in the bores, which enables the shear pins to be adjusted.

The invention claimed is:

1. A method for mounting an aircraft engine onto a pylon, comprising:
attaching a front engine fastener to the engine with connecting rod and ball/socket joint arrangements to form an engine/front fastener assembly;
first, positioning at least a first shear pin either:
into a first opening provided in the front engine fastener;
or into a first bore provided in a front face of the pylon;
then, pre-positioning, after said positioning at least the first shear pin, the engine/front fastener assembly, relative to the pylon, by placing the first shear pin and its corresponding either the first opening or the first bore, opposite a receiving cavity, said receiving cavity being:
either the first bore of the front face of the pylon, if the first shear pin has been positioned into the first opening of the front engine fastener; or
the first opening, if the first shear pin has been positioned into the first bore; and then, inserting the first shear pin into the receiving cavity.

2. The method for mounting an aircraft engine onto a pylon according to claim 1, wherein the pre-positioning includes:
vertically hoisting the engine/front fastener assembly;
positioning an upper part of the front engine fastener and the front face of the pylon substantially in parallel.

3. The method for mounting an aircraft engine onto a pylon according to claim 2, wherein the pre-positioning includes, between the hoisting and the positioning the upper part, shifting forwardly the engine/front fastener assembly.

4. The method for mounting an aircraft engine onto a pylon according to claim 2, wherein the pre-positioning includes, before the hoisting, positioning at least one wedge at least at a ball/socket joint of at least one of the connecting rod and ball/socket joint arrangements, to keep the front engine fastener in position relative to the engine, at an angle suitable for the vertical hoisting continuously from the ground, until the first shear pin is located substantially at the same height as the receiving cavity.

5. The method for mounting an aircraft engine onto a pylon according to claim 4, wherein the inserting includes removing the at least one wedge.

6. The method for mounting an aircraft engine onto a pylon according to claim 2, wherein the positioning the upper part substantially parallel is performed by swinging the front engine fastener relative to the engine.

7. The method for mounting an aircraft engine onto a pylon according to claim 1, further including screwing at least one screw through at least one hole provided to the front engine fastener, in a bore provided in the front face of the pylon.

8. The method for mounting an aircraft engine onto a pylon according to claim 1, wherein the method implements a second shear pin.

9. A front engine fastener for implementing the method according to claim 8, comprising two openings able to receive only the first shear pin and the second shear pin.

10. The method for mounting an aircraft engine onto a pylon according to claim 1, wherein the first shear pin is divided into two.

* * * * *